United States Patent
Wagner et al.

(10) Patent No.: US 9,298,303 B2
(45) Date of Patent: Mar. 29, 2016

(54) DUTY CYCLE MODULATION OF PERIODIC TIME-SYNCHRONOUS RECEIVERS FOR NOISE REDUCTION

(75) Inventors: Daniel Harley Wagner, Grayslake, IL (US); Michael Frederick David Olley, Lake Zurich, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 705 days.

(21) Appl. No.: 12/650,699

(22) Filed: Dec. 31, 2009

(65) Prior Publication Data

US 2011/0157067 A1 Jun. 30, 2011

(51) Int. Cl.
G06F 3/045 (2006.01)
G06F 3/041 (2006.01)

(52) U.S. Cl.
CPC .................. *G06F 3/0416* (2013.01)

(58) Field of Classification Search
CPC .................................................. G06F 3/0416
USPC .......................................... 345/178, 170–176
See application file for complete search history.

(56) References Cited

U.S. PATENT DOCUMENTS

| | | |
|---|---|---|
| 7,504,833 B1 | 3/2009 | Sequine |
| 8,384,695 B2 * | 2/2013 | Lee et al. ........................ 345/178 |
| 2002/0149351 A1 * | 10/2002 | Kanekawa et al. ........... 323/282 |
| 2005/0041018 A1 | 2/2005 | Philipp |
| 2006/0103635 A1 * | 5/2006 | Park .............................. 345/173 |
| 2006/0207806 A1 | 9/2006 | Philipp |
| 2008/0111714 A1 * | 5/2008 | Kremin ........................... 341/33 |
| 2008/0157893 A1 * | 7/2008 | Krah ........................ 331/177 R |
| 2008/0309633 A1 | 12/2008 | Hotelling et al. |
| 2009/0091551 A1 | 4/2009 | Hotelling et al. |
| 2009/0243631 A1 * | 10/2009 | Kuang .......................... 324/658 |
| 2010/0271330 A1 | 10/2010 | Philipp |
| 2012/0162129 A1 * | 6/2012 | Krah et al. ..................... 345/174 |

FOREIGN PATENT DOCUMENTS

| | | |
|---|---|---|
| WO | 2008085416 A1 | 7/2008 |
| WO | 2008085720 A1 | 7/2008 |

* cited by examiner

*Primary Examiner* — Quan-Zhen Wang
*Assistant Examiner* — Tony Davis
(74) *Attorney, Agent, or Firm* — Wolfe-SBMC

(57) ABSTRACT

Methods, systems and apparatus are provided that implement duty cycle modulation of periodic time-synchronous (PTS) receivers for noise reduction. For instance, when a composite signal is received at a PTS receiver, the composite signal includes an input signal and a noise signal. The composite signal is input to a transmission gate of the PTS receiver. The PTS receiver also receives a gating control input signal that turns the transmission gate on and off. A duty cycle controller adjusts a variable duty cycle of the gating control input signal applied to the transmission gate to output an output signal from the transmission gate such that one or more components of the noise signal present in the composite signal is/are reduced in the output signal that is output by the transmission gate.

23 Claims, 8 Drawing Sheets

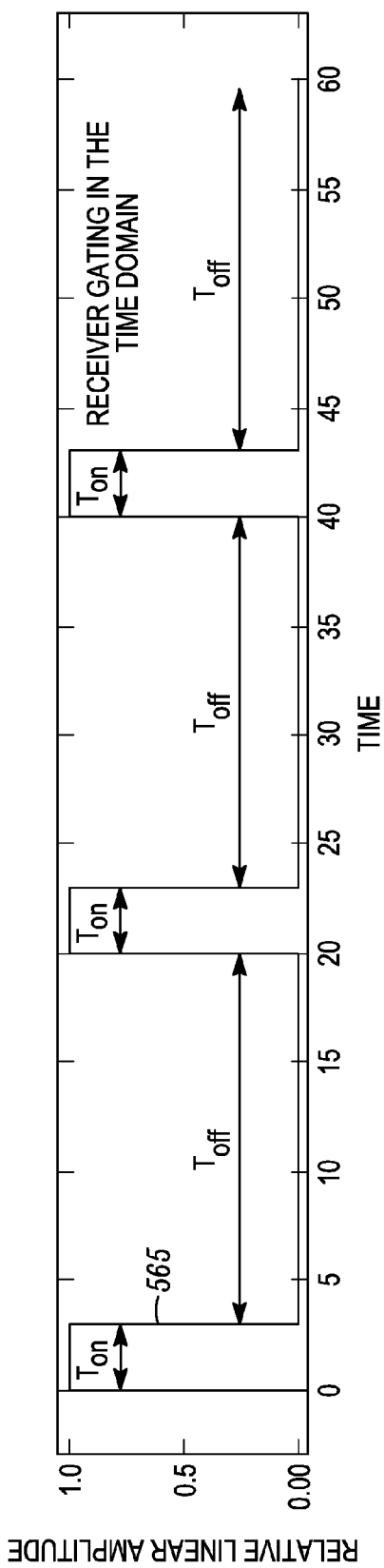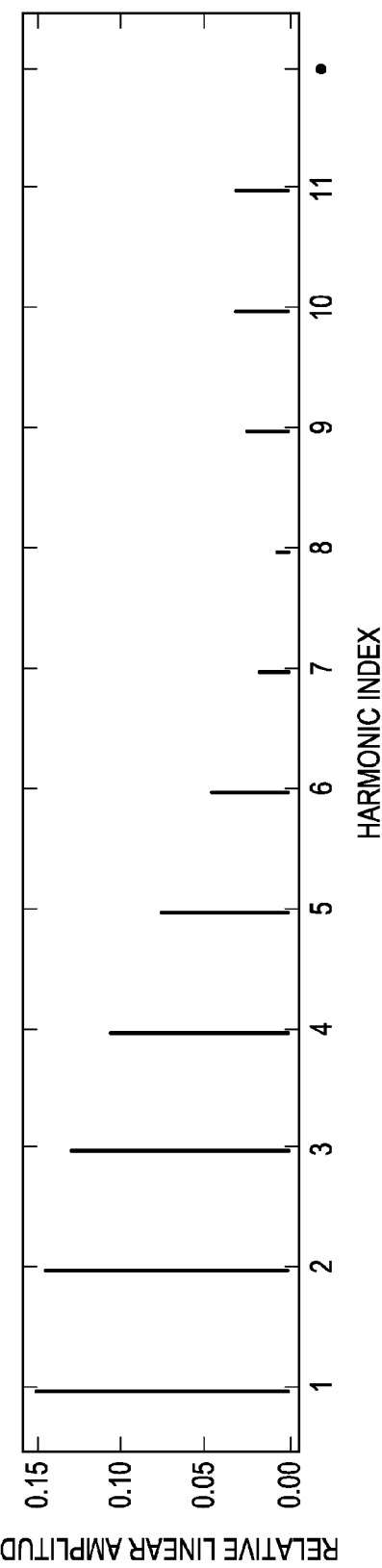

DUTY CYCLE MODULATION OF PERIODIC TIME-SYNCHRONOUS RECEIVERS FOR NOISE REDUCTION

TECHNICAL FIELD

The present invention generally relates to electronic systems, and more particularly to reduction of noise at a periodic time-synchronous receiver implemented in electronic systems.

BACKGROUND

Periodic time-synchronous receivers are implemented in wide variety of modern electronic systems including wired and wireless voice and data communication systems, sensors for scientific, industrial, and consumer device use, and instrumentation for scientific, medical, and industrial use. Periodic time-synchronous receivers can be any one of a number of different types of synchronous/coherent receivers including, for example, receivers employed in sigma-delta A/D converters, receivers employed in communication systems (e.g., general radio receivers, radiotelephone receivers, micropower impulse radar receivers, aircraft communication receivers, fiber optic communication receivers, Ultra Wideband RF receivers, and the like), receivers employed in instrumentation systems (e.g., RF SQUID magnetometers, electrical impedance tomography, and the like), receivers employed in sensor systems (e.g., infrared sensing systems, vibratory MEMS Gyroscopes and the like), and the like.

One particular example of a periodic time-synchronous receiver is a capacitive touchsensing receiver employed in a capacitive sensing system that is used in conjunction with capacitive touchscreen. Capacitive touchscreens implement capacitive sensor technology to detect proximity or position on an object to the touchscreen based on capacitive coupling effects. Because capacitive touchscreen receivers measure very small changes in sensor line to device ground coupling capacitance, and/or very small changes in row to column coupling capacitance, capacitive touchscreen receivers are susceptible to external noise caused by a wide variety of noise sources including, but not limited to capacitively-coupled noise from the LCD implemented beneath the touchscreen, "floating" power supplies, external battery chargers, etc. Such receivers are susceptible to noise at their fundamental measurement frequencies as well as their harmonic, sub-harmonic and/or intra-harmonic frequencies.

Existing methods for noise reduction utilize shielding, frequency hopping, spread spectrum, pre-selection filtering and/or signal amplification to try and reduce and effectively eliminate the noise at the fundamental frequency and its harmonics. However, in some applications, resources such as computing resources, power supplies (i.e., batteries) and physical space can be very limited which can make it difficult or impossible to implement these methods.

Accordingly, it is desirable to provide improved methods and apparatus for reducing, suppressing and/or canceling noise and its effects at a periodic time-synchronous receiver such as a capacitive touchscreen receiver. Furthermore, other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

FIG. 5A is a graph that illustrates an example of a time-domain waveform of a gating signal;

FIG. 5B is a graph that illustrates a corresponding frequency-domain response of a periodic time-synchronous receiver when the gating signal of FIG. 5A is used to control a gating function of the periodic time-synchronous receiver;

DETAILED DESCRIPTION

Figure 1:
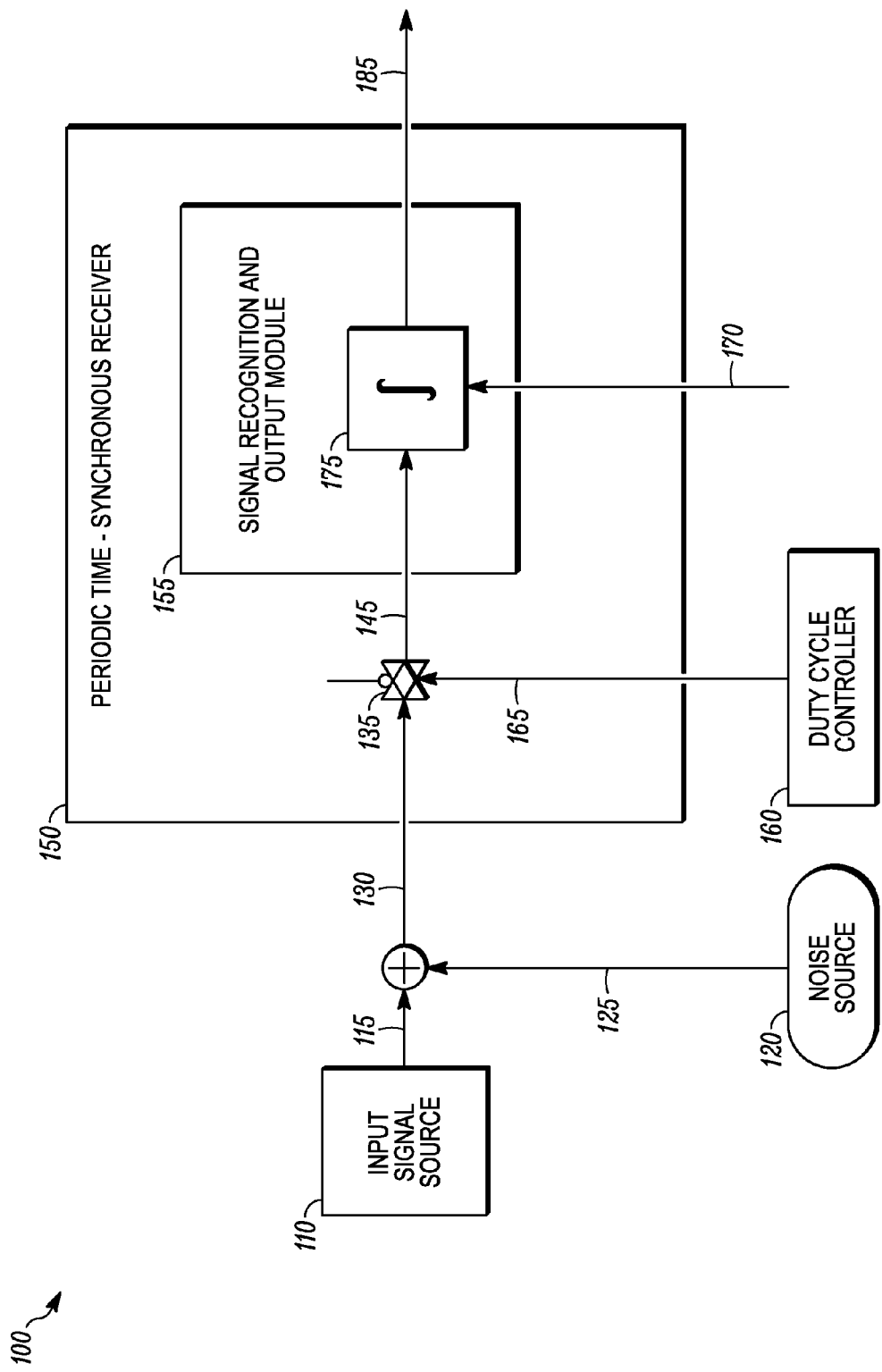
FIG. 1 is a block diagram of an exemplary host system in accordance with some of the disclosed embodiments.

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Overview

Before describing in detail embodiments that are in accordance with the present invention, it should be observed that the embodiments reside primarily in combinations of apparatus components related to reducing one or more components of a noise signal at a periodic time-synchronous (PTS) receiver.

In accordance with some of the disclosed embodiments, systems and methods are provided for reducing one or more components of noise signals arriving at, or inherent in, a periodic time-synchronous (PTS) receiver. In one embodiment, the PTS receiver includes a transmission gate and a signal recognition and output module. The PTS receiver receives a composite signal that includes an input signal received from an intended signal source and a noise signal. The input signal comprises desired information that represents a physical phenomenon that is to be measured or detected or otherwise quantified. The composite signal has a composite receive spectrum that is attributable to both the input signal and the noise signal. This composite spectrum includes the desired information at a particular fundamental measurement frequency and extraneous information attributable to the noise signal.

One of the great strengths of time-synchronous receivers is their high immunity to ambient noise and interfering signals whose frequency content falls outside of, or between, the spectral response peaks of the receiver. As this type of receiver operation provides "processing gain" at the physical level, it permits reception of very weak signals, often those which would otherwise remain hidden below the ambient noise floor, which has proven to be of great advantage in myriad applications. However, one of the drawbacks to periodic time-synchronous receiver operation is that the receiver has multiple spectral response peaks—the receiver not only responds to incoming signals at the intended frequency of periodicity, but it will also detect and report any extraneous incomings signals whose frequency of periodicity is a harmonic of the intended detection frequency. This is usually dealt with by means of a suitable upstream analog or digital filter, or by means of post-acquisition filtering by resource-intensive digital signal processing (DSP), but in applications which are more constrained by limits in cost, size, and computing resources, these additional filtering requirements can be prohibitively burdensome. As will be described herein, the disclosed embodiments can provide a solution for selectively immunizing a time-synchronous receiver against harmonic interferers without the need for these burdensome filtering techniques.

The PTS receiver communicates the composite signal to the transmission gate. The transmission gate also receives a gating control input signal that is used to turn the transmission gate on and off. The gating control input signal comprises a series of pulses that control whether the transmission gate is open. The transmission gate is open during on-state intervals corresponding to the pulses, where each on-state interval corresponds to the duration of a corresponding pulse, and is closed during off-state intervals defined as periods between consecutive pulses. When the transmission gate is "on" during the on-state intervals, the transmission gate selectively allows the composite signal to pass through as an output signal beyond the transmission gate; otherwise it blocks the composite signal from passing and no output signal is passed beyond the transmission gate. When the composite signal is selectively allowed to pass by the transmission gate, the output signal that is output from or delivered by the transmission gate is a replica of the composite signal. The time between the start of consecutive pulses constitutes a measurement period ($T_s$). The ratio of the duration (Ton) of a pulse and a corresponding measurement period ($T_s$) associated with that same pulse defines a duty cycle (DC) of the gating control input signal. The term "duty cycle" refers to the fraction of time that a system is in an "active" state. Duty cycle is used to denote the proportion of time during which a component, device, or system is operated. For example, with respect to an ideal pulse train (one having rectangular pulses), the duty cycle is the pulse duration divided by the pulse period. For a pulse train in which the pulse duration is 1 μs and the pulse period is 4 μs, the duty cycle is 0.25 or 25%.

In accordance with some of the disclosed embodiments, a duty cycle controller can adjust the duty cycle (DC) of the gating control input signal applied to the transmission gate as needed such that the noise signal (or certain components of the noise signal) present in the composite signal is effectively eliminated in the output signal that is output from or "delivered by" the transmission gate. In one embodiment, the duty cycle controller is designed to selectively vary the pulse duration of the gating control input signal so that the on-state intervals of the transmission gate vary in a manner designed to reduce one or more noise components of the noise signal present in the composite signal such that the noise component(s) is/are effectively eliminated from a net recovered signal output by a signal recognition and output module. For example, in one implementation, the variable duty cycle (DC) of the gating control input signal applied to the transmission gate can be adjusted to output an output signal from the transmission gate such that one or more harmonic, sub-harmonic, and/or intra-harmonic components of the noise signal present in the composite signal is/are reduced in the output signal output by the transmission gate, where harmonic relationship is based on the fundamental receiver operational frequency(ies). Here, the term "harmonic" means refers to an integer multiple of a fundamental system measurement frequency. One or more of the noise component(s) can be effectively eliminated due to the effects of harmonic cancellation, produced by the frequency-domain products of the time-domain sequence of the on and off events of the gating function itself.

By selectively varying the pulse duration of the gating control input signal to adjust the variable duty cycle of the gating control input signal, the on-state intervals of the transmission gate vary in a manner designed to eliminate certain harmonic sensitivity peaks (in the composite spectrum of the composite signal) that correspond to one or more noise components of the noise signal. This way, one or more noise components of the noise signal (that were present in the composite signal) can be reduced and/or effectively eliminated from the output signal that is output from or "delivered by" the transmission gate.

The PTS receiver also includes a signal recognition and output module (e.g., a charge integrator in one implementation). The signal recognition and output module is responsive to desired signal content present at the particular fundamental repetition frequency, and also to energy present at harmonic frequencies of the particular fundamental measurement frequency. Because one or more noise components of the noise signal (that were present in the composite signal) have been eliminated from the output signal, the signal recognition and output module can better extract (e.g., detect, measure, discern, accumulate) the desired information from the initially received signal, and the output data generated by the signal recognition and output module will not be impacted by the one or more noise components that were present in the composite receive spectrum at harmonic frequencies which were being targeted for reduction or elimination. For instance, in one implementation in which the signal recognition and output module includes an integrator, the integrator can integrate the desired information included in the output signal to generate the output data that is not impacted by the one or more noise components that were present in the composite receive spectrum (at the targeted harmonic frequencies).

FIG. 1 is a block diagram of an exemplary host system 100 in accordance with some of the disclosed embodiments.

The host system 100 includes an input signal source 110, a periodic time-synchronous (PTS) receiver 150, a signal recognition and output module 155, and a duty cycle controller 160. The input signal source can be any signal source including a line (e.g., transmission line), a radio signal, or any physical structure which is electrically responsive to conducted or radiated external stimulus, which may contain desired signal content. The PTS receiver 150 is generally employed in applications where one or more of the following are needed: high sensitivity, high performance, and/or high tolerance to noise. Such applications can include wired and wireless voice and data communications, sensors for scientific, industrial, and consumer device use, and instrumentation for scientific, medical, and industrial use. The PTS receiver 150 can be any one of a number of different types of synchronous/coherent receivers including, for example, receivers employed in sigma-delta A/D converters, receivers employed in communication systems (e.g., general radio receivers, radiotelephone receivers, micropower impulse radar receivers, aircraft communication receivers, fiber optic communication receivers, Ultra Wideband RF receivers, and the like), receivers employed in instrumentation systems (e.g., RF SQUID magnetometers, electrical impedance tomography, and the like), receivers employed in sensor systems (e.g., infrared sensing systems, vibratory MEMS Gyroscopes and the like), etc.

The input signal source 110 generates a desired output signal 115 that is received by the PTS receiver 150. The desired output signal 115 is comprised of signal and spectral content approximately centered around a "fundamental" frequency, and includes "desired" information that represents a physical phenomenon that is to be detected/measured by the signal recognition and output module 155.

The PTS receiver 150 also receives a noise signal 125 from one or more noise source(s) 120. The noise source 120 may be internal to the host device system 100 or external but communicatively coupled to the host device system 100. Although a single noise source is illustrated, those skilled in the art will appreciate that the noise signal 125 from the noise source 120 can represent different noise signals attributable to a plurality of different noise sources.

A noise signal 125 is inadvertently and/or unavoidably added to desired output signal 115 before it is received by the PTS receiver 150. In other words, the desired output signal 115 and noise signal 125 are both received in a combined form (as represented by the addition symbol) at PTS receiver 150 such that the PTS receiver 150 effectively receives an input signal 130 having a composite receive spectrum that is attributable to the desired output signal 115 and noise signal 125. (In this regard, it is noted that the addition symbol in FIG. 1 is not intended to imply that the noise signal 125 is intentionally combined with the desired output signal 115, rather that the desired output signal 115 is impacted by the noise signal 125 before it is received at the PTS receiver 150.)

The PTS receiver 150 includes a transmission gate 135 and a signal recognition and output module 155. Those skilled in the art will appreciate that the function illustrated by the discrete transmission gate 135 may be implemented either as a separate circuit or structure unto itself, or by means of simply gating one or more of the critical factors of the signal recognition and output module 155, such as one or more of its power supplies or biases, and/or one or more of its digital clocks, digital inputs, or local oscillator inputs, and/or any other factor without which the module 155 is essentially "deaf". Henceforth, reference to a "transmission gate" or gating function, signifies equivalently a circuit or structure unto itself, or alternatively an arrangement which causes the same net effect via gating of a critical factor of the operation of the signal recognition and output module 155.

When the transmission gate 135 is on, it permits signal 115 to pass through such that the transmission gate 135 outputs or delivers output signal 145. In one implementation, the transmission gate 135 outputs or delivers an output waveform 145 that is a replica of an input 130 during a specific time interval which is determined by a control signal (referred to herein as a transmission gate control input signal 165 or a gating control input signal 165) received from a duty cycle controller 160. The transmission gate 135 will selectively block or pass a signal level from the input to the output. The transmission gate 135 can be implemented via an analog or digital electronic element. In one implementation, the transmission gate 135 can be a switching device made from a parallel combination of an N-type MOSFET and a P-type MOSFET with the input at the control gate of one transistor being complementary to the input at the gate of the other so that both transistors are either on or off. The duty cycle controller 160 and gating control input signal 165 will be described in more detail below.

The transmission gate 135 is coupled to the input signal source 110. A noise signal 125 is inadvertently added to the desired output signal 115 before it is received by the transmission gate 135 such that the desired output signal 115 is impacted by the noise signal 125 before being received at the transmission gate 135 of the PTS receiver 150. The noise signal 125 can include noise received from one or more noise sources 120 communicatively coupled to the system. The noise sources 120 can be internal to the system, external to the system, or internal and external to the system.

The desired output signal 115 and the noise signal 125 are both received in a combined form at the transmission gate 135 as a composite signal 130 that includes the desired output signal 115 and a noise signal 125. The composite signal 130 has a composite spectrum that is attributable to the desired output signal 115 and the noise signal 125. As such, the composite spectrum includes desired information from signal 115 at the particular "desired" fundamental frequency, but also includes extraneous information attributable to the noise signal 125. The noise signal in many applications is the superposition of broadband "thermal" and semiconductor device noise, as well as external narrowband and broadband sources from natural phenomena and man-made intentional and unintentional radiators. Due to the inherent immunity of the PTS receiver, most of this noise signal energy will not affect the recovered signal information 185. But one or more components of the noise content, if not rejected by a suitably strong upstream low-pass or band-pass filter, can and do contain spectral energy at harmonics of the particular fundamental measurement frequency, and can thus become an undesired part of the recovered signal information 185. Although the signal recognition and output module 155 is designed to be responsive to the desired output signal 115 (at the intended fundamental receive frequencies of the desired output signal 115), it will also be responsive to harmonics of the desired output signal 115. In many cases, the noise signal 125 will present energy at those harmonics. In a conventional system, the signal recognition and output module 155 would receive a "composite" receive spectrum of signal 130 and would measure/detect/discern/accumulate information in that signal 130. It would be desirable to immunize the PTS receiver 150 from effects of the noise signal 125 by eliminating or reducing such components of the noise signal 125 (that are present in the signal 130).

In accordance with the disclosed embodiments, a duty cycle controller 160 is implemented to combat noise. The duty cycle controller 160 generates a transmission gate control input signal 165 or "gating control input signal 165" that is eventually received by and applied at the transmission gate 135. The gating control input signal 165 generated by the duty cycle controller 160 comprises a series of pulses. Each pulse has a particular duration, and the duration or time between consecutive pulses constitutes a measurement period ($T_s$).

The pulses control whether the transmission gate 135 is open (and in an on-state) or off (and in an off-state) at any particular time. In other words, the transmission gate 135 is "open" during on-state intervals (i.e., where each on-state interval corresponds to the duration of a corresponding pulse), and is "closed" and in an off-state during off-state intervals. The off-state intervals correspond to periods between consecutive pulses. As such, the duration of a particular pulse defines a particular on-time interval of the transmission gate. A ratio of the duration (Ton) of a pulse and a corresponding measurement period ($T_s$) associated with that same pulse defines a duty cycle (DC) of the gating control input signal 165. As will be described below, in accordance with the disclosed embodiments, the duty cycle controller 160 is designed to adjust the duty cycle of the gating control input signal 165 that is applied to the transmission gate 135 such that the duty cycle can be varied. In other words, the gating control input signal 165 can have a "variable duty cycle" that will be referred to below as a first variable duty cycle.

In response to the composite signal 130 and the gating control input signal 165, the transmission gate 135 outputs or "delivers" an output signal 145.

In accordance with the disclosed embodiments, the duty cycle controller 160 is designed to adjust the duty cycle of the gating control input signal 165 applied to the transmission gate 135 such that one or more harmonic components of the noise signal 125 present in the composite signal 130 is reduced in the output signal 145 output by the transmission gate 135. In other words, the duty cycle controller 160 controls and varies the duration of the pulses (and hence the duty cycle of the gating control input signal 165) in a way that mitigates effects of one or more harmonic components of the noise signal 125 (i.e., reduces and/or completely eliminates certain components of the noise signal 125) at the signal recognition and output module 155. For example, in accordance with some of the disclosed embodiments, the duty cycle controller 160 is designed to selectively vary pulse duration(s) of the gating control input signal 165, which also causes the duty cycle of the gating control input signal 165 to be varied.

This way the on-state intervals of the transmission gate 135 can be varied in a manner designed to reduce and effectively eliminate one or more noise components of the noise signal 125 (present in the composite signal 130) from the output signal 145 output from or delivered by the transmission gate 135. In some implementations, the duty cycle controller 160 can adjust/change the variable duty cycle of the gating control input signal 165 such that certain harmonic sensitivity peaks in the composite spectrum of the composite signal 130 that correspond to one or more noise components of the noise signal 125 can be reduced and effectively eliminated in the output signal 145 output by the transmission gate 135.

In accordance with one exemplary implementation, the transmission gate 135 blocks the composite signal 130 from passing when the transmission gate 135 is off during one of the off-state intervals. In addition, even when the transmission gate 135 is "on" (i.e., during one of the on-state intervals) the transmission gate 135 selectively blocks the composite signal 130 when the composite signal 130 is below a particular signal level. By contrast, when the transmission gate 135 is "on" (i.e., during one of the on-state intervals), then the transmission gate 135 selectively allows the composite signal 130 to pass through. As will be described below, when the composite signal 130 is selectively allowed to pass, the output signal 145 that is output from and delivered by the transmission gate 135 is a replica of the composite signal 130 with one or more noise components of the noise signal 125 reduced or removed.

The signal recognition and output module 155 is designed to extract (e.g., measure/discern/accumulate) information concerning the desired output signal 115. The signal recognition and output module 155 can be any module implemented at a PTS receiver 150 that allows the receiver 150 to discern and/or accumulate "presence" or "activity" information regarding the desired signals it is listening for. In some implementations, the signal recognition and output module 155 can be developed to further report digital information either about the received signal, and/or report the informational content embedded within the received signal. But at root, in this regard, the signal recognition and output module 155 can be thought of as a phenomenon recognition module, and in FIG. 1 is illustrated as including an integrator module 180. The signal recognition and output module 155 is responsive to received energy centered about the particular fundamental measurement frequency and to any other received energy (or energies) present at harmonic frequencies of the particular fundamental measurement frequency. Energy at the harmonic frequencies may correspond to certain harmonic sensitivity peaks of the signal recognition and output module 155.

When the signal recognition and output module 155 receives the output signal 145 (having the one or more noise components effectively eliminated therefrom), it can extract the desired information from the output signal 145 to generate output signal 185 that is an analog or digital representation of the desired information from the desired input signal 115. Because one or more of the noise components of the noise signal 125 is substantially cancelled and blocked in the output signal 145, the output data 185 that is generated is not impacted by one or more noise components that were present in the composite receive spectrum 130 at harmonic frequencies (that would otherwise correspond to certain harmonic sensitivity peaks of the signal recognition and output module 155). As such the output data 185 is "noise-reduced" in comparison to output data that would be generated in absence of the duty cycle controller, and in some implementations is substantially free of noise components attributable to the noise source 120. As a result, the noise-reduced output data 185 more accurately represents desired output signal 115.

As mentioned above, the signal recognition and output module 155 can extract the desired information from the output signal 145 to generate output data 185. Here the term "extract" can mean detect, measure, discern and/or accumulate. For instance, in one implementation, the signal recognition and output module 155 includes an integrator module 175 that measures and integrates information included in the output signal 145 to generate output data 185 that digitally represents integrated desired information from the desired output signal 115. However, in other implementations, the integrator module 175 can represent a module that extracts information. For instance, in other implementations the integrator module 175 could be replaced one or more of a leaky peak detector, a mixer, an I-Q demodulator, an integrator, a differentiator, filters, an A/D converter, further signal conditioning modules, other known signal recognition devices, and the like. Further details regarding operation of the duty cycle controller 160 will now be described below with reference to FIGS. 2-10 where one exemplary implementation is described. In this implementation, the PTS receiver 150 is a capacitive touchsensing (CT) receiver and the signal recognition and output module is a charge integrator that includes an integrator module, a measurement module designed to measure the charge integrated, and a reset mechanism designed to reset or empty the integrator module.

Figure 2:
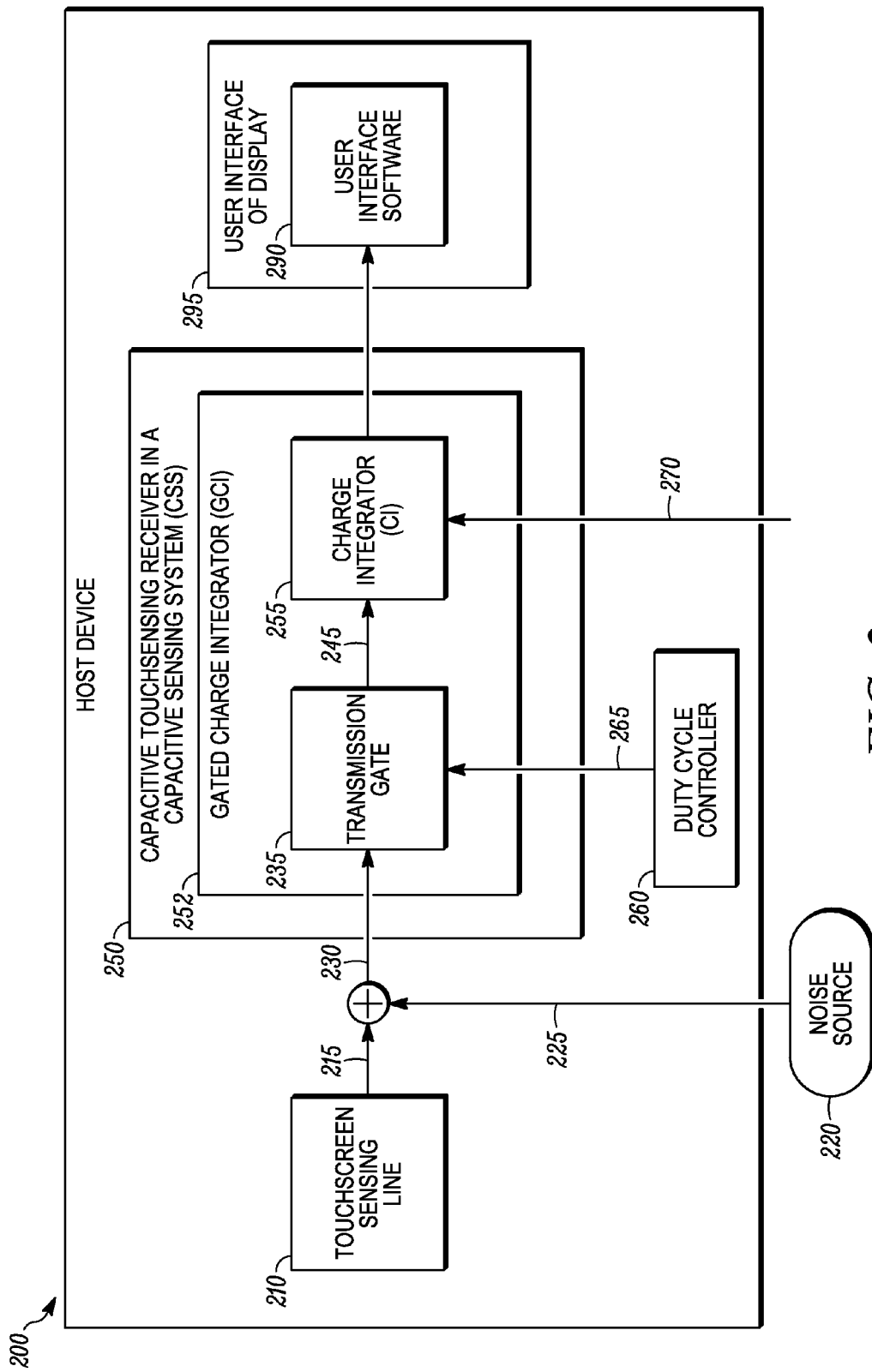
FIG. 2 is a block diagram of a host system in accordance with one exemplary implementation of the disclosed embodiments.

FIG. 2 is a block diagram of a host system 200 in accordance with one exemplary implementation of some of the disclosed embodiments.

The host system 200 can be a device that includes a capacitive touchscreen (CTS) that includes a charge-transmit line (not shown) that outputs a signal 215 to a touchscreen sensing line 210, a Capacitive Sensing System (CSS) that includes a capacitive touchsensing (CT) receiver 250 that operates as a periodic time-synchronous (PTS) receiver, a duty cycle controller 260, a liquid crystal or organic light emitting diode (OLED) display (not illustrated in this figure), a user interface software module 290 and a user interface module 295 (e.g., implemented vis a vis the host device and its display). The CT receiver 250 includes a gated charge integrator 252 that comprises a transmission gate 235 and a charge integrator module 255.

A touchscreen can generally refer to a display that can detect the presence and location of one or more touches within the display area. Although the term "touch" generally refers to touch or contact to the display of the device by a finger or hand, touchscreens can also be constructed and utilized to sense other passive objects, such as an untethered stylus, or active objects, such as a tethered, conductive, field-emitting or field-sinking "pen". A touchscreen enables one to interact with what is displayed directly on the screen, where it is displayed, without necessarily requiring any intermediate device such as a mouse, touchpad, stylus, keyboard, etc, but may also permit the use of one or more such intermediate devices. One type of touchscreen is a capacitive touchscreen, such as a self-capacitance sensing touchscreen (SCTS) or a mutual capacitance touchscreen (MCTS). Features of a CTS that are implicated in this embodiment will be described below.

The CTS includes multiple transmit lines, each of which generates a desired excitation signal. As is known in the art, each transmit line can be coupled to a corresponding touchscreen sensing line. For sake of simplicity only a single touchscreen sensing line 210 and its output excitation signal 215 is shown; however, those skilled in the art will appreciate that a practical CTS includes multiple charge-transmit lines, each of which generates a corresponding excitation signal, and multiple logical receiving channels, which may be a combination of one or more physical receiving modules, and a multiplex switch array to selectively listen on one or more physical sensing lines in the desired order, at the desired times. The excitation signal 215 generated by one of the touchscreen sensing lines 210 of the CTS is one of the desired signals that the CT receiver 250 is intended to receive. The excitation signal 215 has a fundamental frequency and provides charge that is to be integrated by the charge integrator 255. The charge movement resulting from the excitation signal 215 includes information that represents a touch applied to the touchscreen (or the absence thereof) that is to be integrated by a gated charge integrator 252, then measured, processed, and reported to the user interface software 290, touchscreen event messages. In other words, in this implementation, charge provided via the transmit lines is used to represent a touch applied to the touchscreen or the absence thereof. In this implementation, the user's touch can be sensed based on charge provided (via current and/or voltage based charge excitation signals) from the multiple transmit lines to corresponding touchscreen sensing lines that are part of the CTS 210.

The CT receiver 250 also receives a noise signal 225 that can include noise received from one or more noise source(s) 220 that are communicatively coupled to the system. The noise sources 220 can be internal to the system, external to the system, or internal and external to the system. For example, the noise source 220 may be internal to the host device system 200 or external but communicatively coupled to the host device system 200. Although a single noise source is illustrated, those skilled in the art will appreciate that the noise signal 225 from the noise source 220 can represent different noise signals attributable to a plurality of different noise sources. The noise source 220 can be, for example, an external power supply that is coupled to the host device system 200 that generates periodic common-mode interference/noise, and/or a main display (e.g., LCD located below the touchscreen) that capacitively couples differential mode interference/noise to the touchscreen. Such noise 225 can cause various problems (e.g., excessive "jitter" in the user's touches which are being reported to the user interface software 290). The noise content coming from the display varies based on image content, frame rate, and other relevant operational factors. In addition, common-mode electrical noise from an external power supply varies in its amplitude and frequency content, depending on where an internal battery may be in its charge cycle, how much current the host device 200 is drawing for its own purposes, the particular design of the external power supply, the AC mains voltage, the wiring configuration of the AC mains, etc.

As above, the noise signal 225 is inadvertently and/or unavoidably added to excitation signal 215 before it is received by the CT receiver 250. In other words, the excitation signal 215 and noise signal 225 are both received in a combined form (as represented by the addition symbol) as a composite signal 230 at the transmission gate 235 of the CT receiver 250. As such, the composite signal 230 received at the CT receiver 250 has a composite receive spectrum that is attributable to the signal 215 and noise signal 225. (In this regard, it is noted that the addition symbol in FIG. 2 is not intended to imply that the noise signal 225 is intentionally combined with the signal 215, but just that the signal 215 is impacted by the noise signal 225 before it is received at the CT receiver 250.) It is desirable to reduce and/or eliminate the effects of the noise source at the touchscreen. This way the noise signal 225 that is present in signal 230 does not impact the output data 285 that would otherwise be provided to the user interface software module 290.

The capacitive touchsensing receiver 250 is coupled to charge-transmit lines from the CTS and receives multiple input signals 230 (i.e., one signal from each of the touchscreen sensing lines from the CTS). Each of the touchscreen sensing lines corresponds to a receiver channel.

Each input signal 230 is provided to a Gated Charge Integrator (GCI) 255. For sake of simplicity only a single input signal 230 and a single GGI 255 are shown; however, those skilled in the art will appreciate that there may be multiple instances of each in a practical CSS system that includes multiple transmit lines, with a sequenced multi-plexing switch array to select which transmit line(s) may be coupled to which receiver channel(s) at any given instance in time; such practitioners will also note that the switching elements themselves in such a multiplexing array may be used to perform the transmission gate function 235.

Each GCI 252 is controlled by a gating signal 265 (also referred to as a transmission gate control input signal 265) that is applied to the transmission gate 235 of the GCI 252. During operation, each GCI 255 usually is not run continuously, but only in defined time slots. Within each time slot the GCI 255 is in either an on-state interval ($T_{on}$) or an off-state interval ($T_{off}$) at any particular time. In other words, each GCI is in an on-state interval ($T_{on}$) or off-state interval ($T_{off}$) at a measurement frequency (Fs) and duty cycle (D). The signal 265 controls when the GCI 252 is "on" (i.e., is in an on-state interval ($T_{on}$) and performs a charge integrating function) or "off" (i.e., is in an off-state interval ($T_{off}$) and does not perform a charge integrating function). During the on-state interval ($T_{on}$) the GCI 252 accumulates charge that is being bursted out of a particular transmit line of the CTS. During the on-state interval ($T_{on}$) the charge integrator 255 of the GCI 252 actively integrates the input signal 230, and during the off-state interval ($T_{off}$) the GCI 252 is off and does not integrate the input signal 230. GCIs are well-known in the art and for sake of brevity will not be described further herein.

Within each time slot, the number of charge integration "pulses" within that time slot may be termed the "burst length", and the group of pulses within the time slot may be termed the "burst". The amount of time between bursts, and the repetition rate of the bursts, create additional, smaller receiver response peaks at sub-harmonics and inter-harmonics of the fundamental system measurement frequency. As will be described below, these additional receiver response peaks can also be reduced by modulating the burst length or duty cycle.

Each GCI 255 includes a transmission gate 235 (e.g., a MOSFET-based switching element) and a capacitor-based charge integrator 255. In many implementations, the charge integrator 255 will be a module also containing other functions, such as and A/D converter adequate to report on the quantity of charge accumulated, and a mechanism to reset, or "empty" the integrator, so as to make discrete-time measurements.

As above, the transmission gate 235 outputs or delivers an output waveform 245 that is a replica of an input 230 during a specific time interval which is determined by a control signal (referred to herein as a gating control input signal 265 or gating signal 265) received from a duty cycle controller 260. The transmission gate 235 will selectively block or pass a signal from its input to its output. The transmission gate 235 can be implemented via analog or digital electronic elements. In one implementation, the transmission gate 235 can be a switching device made from a parallel combination of an N-type MOSFET and a P-type MOSFET with the input at the control gate of one transistor being complementary to the input at the gate of the other so that both transistors are either on or off. The duty cycle controller 260 and gating signal 265 will be described in more detail below.

The transmission gate 235 is coupled to one of the transmit lines of the CTS, and to the charge integrator 255. Ideally, the transmission gate 235 would only receive desired excitation signal 215 that is transmitted to it over a corresponding touchscreen sensing line 210 from the CTS. However, because the touchscreen sensing line 210 acts as an antenna, one with virtually no frequency-selectivity, a noise signal 225 can inadvertently be added to the excitation signal 215 before it is received by the transmission gate 235. Because the GCI 252 also receives the noise 225, the composite receive spectrum of the composite signal 230 received at the transmission gate 235 includes not only the desired excitation signal 215 but also the noise signal 225. The composite spectrum of signal 230 includes charge from signal 215 at the particular "desired" fundamental frequency, but also includes extraneous information attributable to the noise signal 225, some of which may occur at harmonics of the particular fundamental measurement frequency.

Each GCI 252 includes a charge integrator 255 that receives the composite signal 230 and functions as a periodic time synchronous, or "coherent", charge integrator. Although not illustrated in FIG. 2, the charge integrator 255 includes at least an integrator module (not illustrated), and a measurement module (not illustrated) designed to measure the charge integrated. The charge integrator 255 also receives an integrator reset input 270 that triggers the integrator to reset or clear itself in order to start taking a different, distinct measurement, from either the same transmit-receive matrix node, or from the next one in the system scanning sequence. The charge integrator 255 accumulates charge in signal 230. Ideally, changes in the accumulated charge observed from one measurement and/or scan cycle to the next can be used to determine presence, location, and size of objects in contact or within the vicinity of the touchscreen (e.g., to determine presence of a users' fingers on or near the touchscreen). Although the charge integrator 255 is designed to be responsive to the excitation signal 215 (at the intended fundamental receive frequencies of the excitation signal 215) and to accumulate charge from the excitation signal 215, the charge integrator 255 will also be responsive to harmonics of the excitation signal 215. In many cases, the noise signal 225 will present energy at those harmonics. In a conventional system, the charge integrator 255 would receive a "composite" receive spectrum of signal 230 and would integrate charge in that signal 230.

Regardless of the noise source 220 it is desirable to immunize the CT receiver 250 from effects of the noise signal 225 by reducing and/or eliminating components of the noise signal 225 that are present in the signal 230.

In accordance with the disclosed embodiments, a duty cycle controller 260 is implemented to combat noise. The duty cycle controller 260 generates a gating control input signal 265 that is received by and applied to the transmission gate 235 to control/adjust the duty cycle (DC) of the transmission gate 235 and therefore to control the duty cycle of the output signal 245 that is provided to the charge integrator 255. The duty cycle controller 260 will adjust/change the duty cycle that determines or dictates how the transmission gate 235 is turned on and off over time. In accordance with the disclosed embodiments, the duty cycle controller 260 controls/adjusts the DC of the transmission gate 235 such that certain harmonics (that correspond to noise) are eliminated from the composite signal 230 to reduce and/or eliminate the effects of noise signal 225 so that the charge integrator 255 generates a digital representation of integrated charge output data 285 with noise components eliminated at certain harmonic sensitivity peaks (referred to herein as "noise-reduced output data 285").

Figure 3:
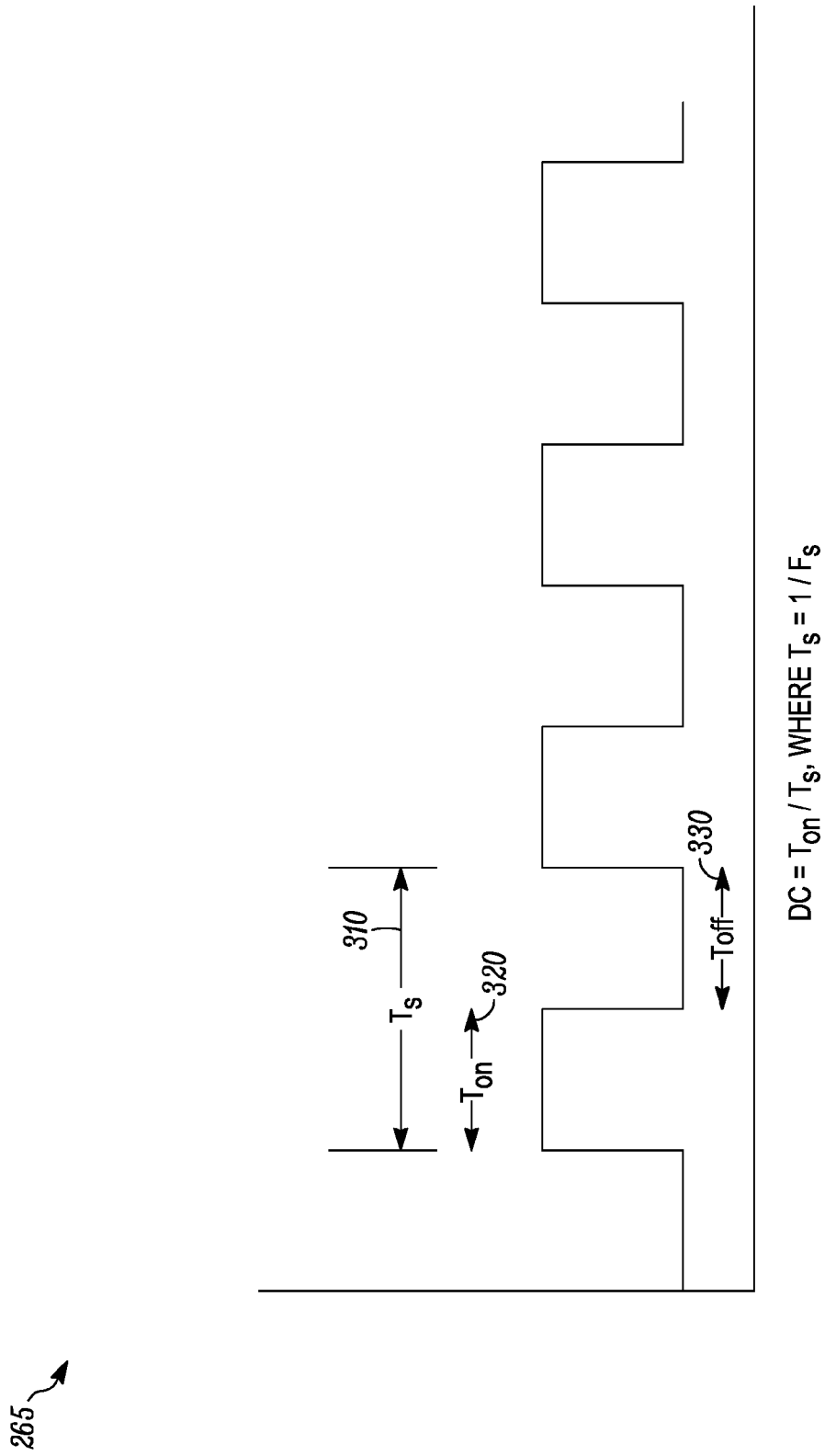
FIG. 3 is a waveform of a gating signal generated by the duty cycle controller and applied to a transmission gate.

FIG. 3 is a waveform of a gating signal 265 generated by the duty cycle controller 260 and applied to a transmission gate 235 of a GCI 252 to control whether the GCI is in an on-state interval ($T_{on}$) 320 or an off-state interval ($T_{off}$) 330 at any particular time during its operation.

The gating signal 265 generated by the duty cycle controller 260 comprises a series of pulses. Each pulse has a particular duration, and the duration or time between consecutive pulses or "on-state intervals" constitutes a measurement period ($T_s$) 310. These pulse trains may be perfectly periodic and consistent in their duty cycles, or they may contain deliberately placed changes in the duty cycle for individual pulses in order to further enhance noise cancellation as described herein, by shaping the sub-harmonic and intraharmonic spectral response envelope of the receiver. In accordance with some the disclosed embodiments, to further reduce and/or eliminate noise, convolutional "windowing" can be applied to the duty cycles of pulses within the pulse train of gating signal 265. In some of the disclosed embodiments, a convolutional windowing technique can be applied to change the integration periods that are determined by the "on" duration of the gate pulse (i.e., when the transmission gate is open). In this convolutional windowing technique the amplitude weights of the convolution windows are converted into discretized deltas that are applied to individual gate pulses within the longer pulse trains (and hence applied to lengths of the individual integration periods comprising an acquisition burst). These delta functions are additional adjustments that can be injected into the pulses to give even better control over the receiver's frequency response spectrum. This convolutional windowing technique works well with respect to sub-harmonic and intra-harmonic receiver response spectrum and hence to interferers that were not on harmonics of the measurement frequency. These noise reductions are accomplished by improvements to the sensing apparatus itself, and improvements in the direction of its operation, without resorting to the conventionally employed upstream filter hardware and/or downstream post-acquisition digital signal processing, which incur substantial size, cost, and current drain burdens for the overall device. Rather, the noise reduction improvements can be accomplished by improvements to the process and apparatus of the acquisition itself.

The pulses control whether the transmission gate 235 is open (and in an on-state) or off (and in an off-state) at any particular time. In other words, the transmission gate 235 is "open" during on-state intervals 320 (i.e., where each on-state interval corresponds to the duration of a corresponding pulse), and is "closed" and in an off-state during off-state intervals 330. The off-state intervals 330 correspond to periods between consecutive pulses. As such, the duration of a particular pulse defines a particular on-time interval 320 of the transmission gate. The sum of an on-state interval ($T_{on}$) 320 and a next consecutive off-state interval ($T_{off}$) 330 is equal to the measurement period ($T_s$) 310. The measurement period ($T_s$) 310 is the inverse, or "reciprocal," of the fundamental measurement frequency ($F_s$). The ratio of the on-state interval ($T_{on}$) 320 to the measurement period ($T_s$) 310 defines the duty cycle (DC). A ratio of the duration (Ton) of a pulse and a corresponding measurement period ($T_s$) associated with that same pulse defines a duty cycle (DC) of the gating signal 265. As such, the on time ($T_{on}$) 320 of the measurement period ($T_s$) 310, defines the duty cycle (DC) of what is effectively a "square wave" of receiver integration.

As will be described below, in accordance with the disclosed embodiments, the duty cycle controller 260 is designed to adjust the duty cycle of the gating signal 265 that is applied to the transmission gate 235. As such, the gating signal 265 can have a "variable duty cycle" that will be referred to below as a first variable duty cycle. The duty cycle controller 260 can adjust the duty cycle of the gating signal 265 by varying pulse duration(s) of the gating signal 265. The duty cycle controller 260 does this in a way to reduce the noise signal 225 in the output signal 245 that is output from and delivered by the transmission gate 235. To explain further, the duration of the pulses of the gating signal 265 (and hence the on-state intervals 320 of the transmission gate 235) can be varied in a manner designed to eliminate one or more noise components of the noise signal 225 (present in the composite signal 230) from the output signal 245 that is output from and delivered by the transmission gate 235 and provided to the charge integrator 255. As will be described below in greater detail with reference to FIGS. 4-10, the duty cycle controller 260 can adjust/change the variable duty cycle of the gating signal 265 such that certain harmonic sensitivity peaks in the composite spectrum of the composite signal 230 (that correspond to one or more noise components of the noise signal 225) can be reduced or eliminated in the output signal 245 that is output from and delivered by the transmission gate 235. In particular, the duty cycle controller can adjust the duty cycle to either: (1) move/adjust harmonic locations within the sensitivity response spectrum of the CT receiver 250 to eliminate one or more of the harmonic sensitivity response peaks and prevent it from corrupting the desired excitation signal 215, and/or (2) place frequency domain sensitivity nulls in the sensitivity response spectrum of the CT receiver 250 such that the frequency domain sensitivity nulls are made to coincide with known locations of one or more known in-band interferers that need to be blocked/cancelled so that the frequency domain sensitivity nulls cancel the known in-band interferers and they do not corrupt the desired excitation signal 215. This is done directly in the physical receiver apparatus (i.e., outside of the use of any pre-filtering or post-processing), at no cost of computing resources or power consumption, as would be required in more typical post-acquisition DSP, where heavy cost/size/current drain penalty is incurred. This noise reduction is also produced without the cost and size burden of upstream analog filtering, as it simply leverages the existing system hardware ways to produce the effect which heretofore required extra hardware and/or software. In this way certain spectral content can be eliminated and so that components of noise signal 225 at those harmonics, and even between those harmonics, can be substantially cancelled and blocked and have no impact.

In one implementation, the duty cycle controller can switch between pre-determined duty cycles. For example, a set of particular duty cycles can be identified in advance (e.g., using Fourier analysis of the receive timing) that will reduce and/or eliminate certain harmonics from the receiver noise susceptibility spectrum. For instance, it has been determined that some implementations, that will be described below with reference to FIGS. 7-10, that switching between duty cycles of 33%, 50%, 67% and 95+% can help eliminate almost all harmonic susceptibilities. In another implementation, the duty cycle can be varied dynamically in real time in a way that will reduce and/or eliminate noise, including the sub-harmonic and intra-harmonic bands.

Referring again to FIG. 2, in response to the composite signal 230 and the gating signal 265, the transmission gate 235 outputs an output signal 245. In one implementation, the transmission gate 235 blocks the composite signal 230 from passing when the transmission gate 235 is off during one of the off-state intervals 330. By contrast, when the transmission gate 235 is "on" (i.e., during one of the on-state intervals 320), then the transmission gate 235 selectively allows the composite signal 230 to pass through.

The duty cycle of the transmission gate 235 determines or controls the on-state period during which the charge integrator 255 is permitted to measure and integrate charge present in the composite signal 230. As noted above, the charge integrator 255 is responsive to received energy present at the particular fundamental measurement frequency and to any other received energy (or energies) present at harmonic frequencies of the particular fundamental measurement frequency. Energy at the harmonic frequencies may correspond to certain harmonic sensitivity peaks of the charge integrator 255. By adjusting/changing the duty of the transmission gate 235, duty cycle of the output signal 245 that is provided to charge integrator 255 is also adjusted such that nulls of the sensitivity spectrum of the charge integrator 255 change or "move" so that certain harmonic sensitivity peaks (that correspond to noise 225) are cancelled and eliminated from the composite signal 230.

The charge integrator 255 is designed to integrate (e.g., accumulate) charge in the excitation signal 215. When the charge integrator 255 receives and integrates the output signal 245, it can generate integrated charge output data 285 that more accurately represents integrated charge from the excitation signal 215 (i.e., that is a digital representation of the charge from the excitation signal 215) since one or more noise components have been eliminated that would have otherwise been present. In other words, because one or more of the noise components of the noise signal 225 is substantially cancelled and blocked in the output signal 245, the integrated charge output data 285 that is generated is not impacted by those noise components that were present in the composite receive spectrum 230 at harmonic frequencies (that could otherwise correspond to certain harmonic sensitivity peaks of the charge integrator 255). As a result, the integrated charge output data 285 is noise reduced in comparison to output data that would be generated in absence of the duty cycle controller 260. In some implementations, the integrated charge output data 285 is substantially free of noise components attributable to the noise source 220. Because certain noise component(s) have been reduced and/or eliminated, those component(s) do not negatively impact the output data 285 that is reported to the user interface software 290 of the host device 200. As a result, the noise-reduced integrated charge output data 285 more accurately represents or more closely corresponds to the desired excitation signal 215. As a further benefit, such receiver systems with improved noise immunity can also permit the use of, or coexistence with, noisier system components than would have otherwise been possible, which permits a wider range of application, as less expense of the device(s) employing the disclosed embodiments, and also permits reduced requirements and/or expense of the other devices being using in conjunction or in proximity, as their noise contributions to the recovered signal 285 will be reduced or eliminated.

Figure 4:
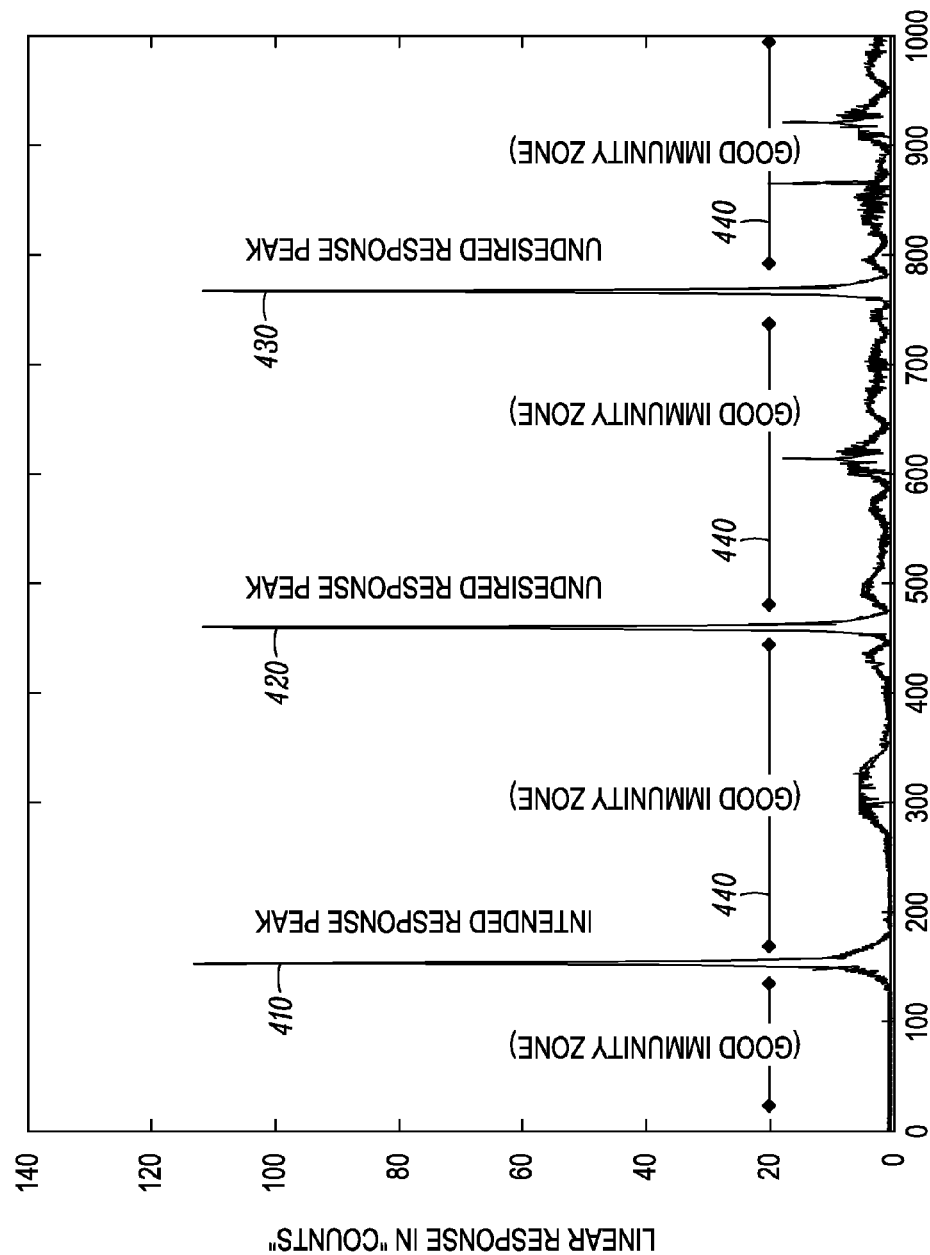
FIG. 4 is a graph that illustrates a measured spectral response of a periodic time-synchronous receiver when operated at a fifty-percent (50%) duty cycle.

FIG. 4 is a graph that illustrates a measured spectral response of a periodic time-synchronous receiver when operated at a fifty-percent (50%) duty cycle without upstream spectral filtering or post-acquisition digital signal processing. In the description of FIG. 4 that follows, the PTSR will be described as the capacitive touchsensing receiver 250 of FIG. 2, and therefore FIG. 4 will be described as a sensitivity spectrum of the capacitive touchsensing receiver 250. However, it will be appreciated that the graph in FIG. 4 may more generally correspond to any periodic time-synchronous receiver. As illustrated in FIG. 4, the sensitivity spectrum of the capacitive touchsensing receiver 250 (or any other coherent/periodic time synchronous receiver) includes: (A) sharp response peaks of sensitivity (or "sensitivity response peaks") 410-430 at a fundamental measurement frequency (Fs) and harmonics thereof; and (B) immunity zones 440 that exist between the sharp response peaks of sensitivity 410-430. The sensitivity response peaks 410-430 and immunity zones 440 are a characteristic of any coherent receiver (or other synchronous demodulator), when unaccompanied by external upstream analog filtering or post-acquisition processing.

Frequency and amplitude of the sensitivity response peaks 410-430 are determined by the fundamental measurement frequency ($F_s$) and duty cycle (D). The sharp sensitivity response peaks 410-430 include a fundamental sensitivity response peak 410 at a fundamental measurement frequency (Fs), and other harmonic sensitivity response peaks 420-430 (or "image frequencies") at harmonics of the fundamental measurement frequency (Fs). Any incoming signal energy at the fundamental sensitivity response peak 410 and the harmonic frequency sensitivity response peaks 420-430 will register in the receiver block. By contrast, the immunity zones 440 are the frequencies at which, if any incoming signal energy presents itself, even at very strong amplitudes, the receiver will not register it (i.e., it is not heard by the receiver).

The fundamental sensitivity response peak 410 is intentional and desirable and is always located where it "should" be.

The harmonic sensitivity response peaks 420-430 are potential liabilities since the incoming signal energy at the harmonic frequency sensitivity response peaks 420-430 can corrupt the desired signal data 215 (that should be processed by the receiver 250) thereby introducing errors in the data 285 that is eventually reported to the host system 290. The harmonic sensitivity response peaks 420-430 are responsive to any interferers that fall upon those harmonic frequency sensitivity response peaks 420-430. Without further burdensome processing, the incoming signal energy at the harmonic frequency sensitivity response peaks 420-430 is indistinguishable from the desired signals that the capacitive touchsensing receiver 250 is intended to receive at the fundamental frequency (represented by the fundamental sensitivity response peak 410). In this regard, the harmonic sensitivity response peaks 420-430 are the frequencies at which, if any incoming signal energy presents itself, the desired signal data 215 that should be processed by the receiver 250 will be corrupted thereby introducing errors or inaccuracies in the data 285 that is eventually reported to the host system 290. The frequencies and amplitudes of some interfering noise sources are deterministically known, but others are not, since the frequencies of many interferers to a capacitive touchsensing receiver 250 (and most other coherent receivers) are unstable and tend to move such that they are unknown and not controllable.

The relationship between the duty cycle (DC), fundamental measurement frequency ($F_s$) and noise will now be described in greater detail below.

Figure 6A:
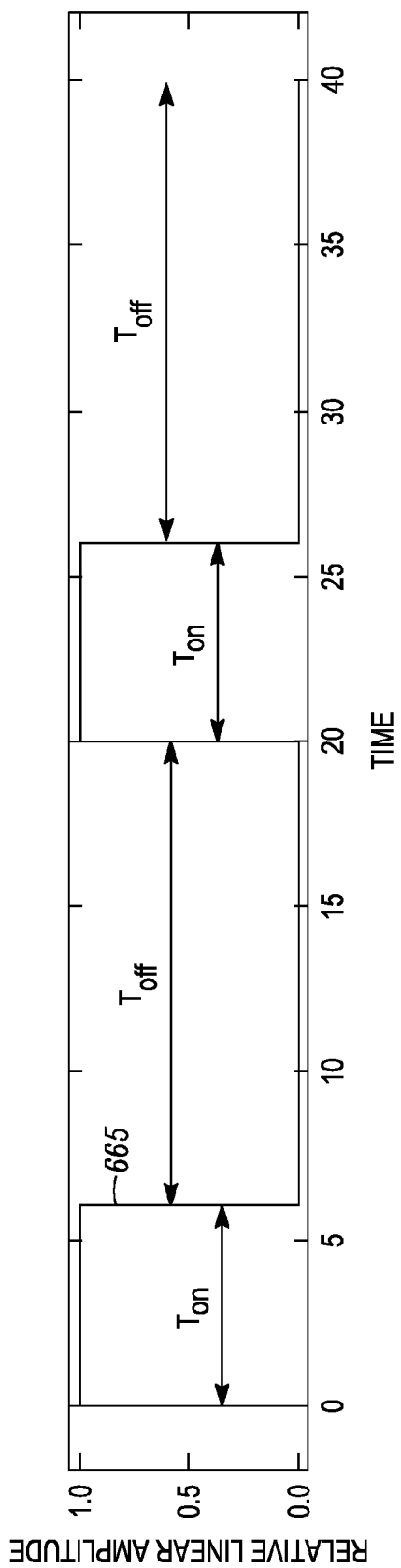
FIG. 6A is a graph that illustrates another example of a time-domain waveform of a gating signal.

FIG. 5A illustrates an example of a time-domain waveform of a gating signal 565. The gating signal 565 can be applied to the transmission gate 235, where the relative linear amplitude of each pulse is illustrated in no particular units. (A signal 265 having the same duty cycle would be applied to the charge integrator 255 of the GCI 252 of the capacitive touchsensing receiver 250.) FIG. 5B illustrates a corresponding frequency-domain response of a periodic time synchronous receiver when the gating signal 565 of FIG. 5A is applied to its transmission gate control input to control a gating function of the periodic time-synchronous receiver. FIG. 6A is a graph that illustrates another example of a time-domain waveform of a gating signal 665, and FIG. 6B is a graph that illustrates a corresponding frequency-domain response of a periodic time-synchronous receiver 250 when the gating signal 665 of FIG. 6A is applied at the periodic time-synchronous receiver's transmission gate control input.

In FIGS. 5A and 6A, the repetition rate of the gating signal sets the fundamental measurement frequency ($F_s$). The measurement period ($T_s$) is the reciprocal of the fundamental measurement frequency ($F_s$). In FIGS. 5B and 6B, where the relative linear amplitude of each harmonic is illustrated in no particular units with respect to harmonic index, and the fundamental measurement frequency (Fs) has a harmonic index of one (1), the next higher harmonic (commonly termed the "second harmonic") of the fundamental measurement frequency (Fs) has a harmonic index of two (2), the third harmonic of the fundamental measurement frequency (Fs) has a harmonic index of three (3), etc.

Figure 6B:
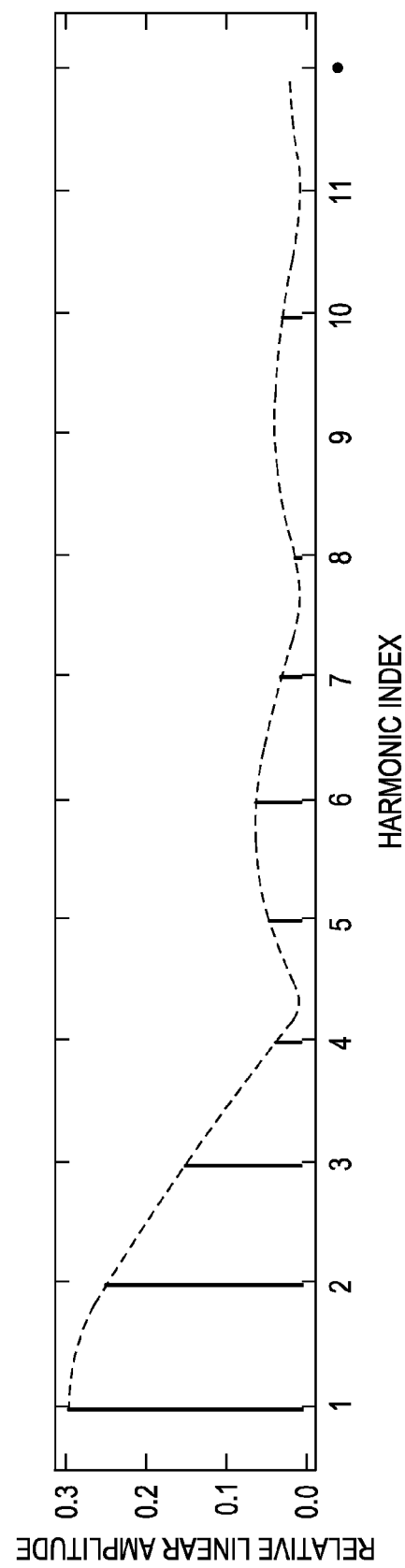
FIG. 6B is a graph that illustrates a corresponding frequency-domain response along with an envelope of the amplitudes of the frequency-domain harmonic response of a periodic time-synchronous receiver when the gating signal of FIG. 6A is applied at the gate of the periodic time-synchronous receiver.

FIG. 6B also illustrates an envelope of the amplitudes of the frequency-domain harmonic response of the capacitive touchsensing receiver 250 when the gating signal waveform of FIG. 6A is applied to the GCI of the capacitive touchsensing receiver 250. The envelope is the continuous representation of the relative linear amplitude of sensitivity response peaks at each harmonic and all points between consecutive sensitivity response peaks at each of the harmonics. The envelope of the amplitudes of the sensitivity response peaks represents how responsive the receiver is to each such sensitivity response peak. Stated differently, the amplitude of a sensitivity response peak determines the relative responsiveness of the receiver at its corresponding harmonic value, where a high amplitude correlates to a high responsiveness of the receiver at that harmonic, and vice-versa.

The sensitivity response peaks (which are located at the harmonics) each have an amplitude in the frequency domain. The overall shape of the envelope and the locations of the harmonics of the fundamental measurement frequency (Fs) are determined by the fundamental measurement frequency (Fs) and duty cycle (DC) of the gating signal 665. The envelope has a shape that follows a sinc function, where the sinc function $[(\sin \pi x)/\pi x]$ can be defined in terms of the fundamental measurement frequency (Fs) and duty cycle (DC) of the gating signal 665. More specifically, the envelope of the amplitudes of the sensitivity response peaks as a function of harmonic index follows a shape of the absolute value of a frequency domain sinc function ($|\text{sinc} (\pi Fs/DC)|$). Thus, the shape of envelope of the sinc function (sinc ($\pi Fs/DC$)) can be defined based on the ratio of the fundamental measurement frequency (Fs) to a duty cycle (DC). Zero-crossings of the normalized sinc function [sinc ($\pi Fs/DC$)] occur at integer multiples of the ratio Fs/DC such that the envelope has periodic nulls at integer multiples of the ratio Fs/DC. In other words, the zeros or nulls will occur when Fs/DC=1, 2, 3, . . .

Varying the Receiver's Duty Cycle to Eliminate Noise at Sensitivity Peaks

As described above, the frequency and amplitude of the sensitivity response peaks 410-430 are determined by the fundamental measurement frequency ($F_s$) and duty cycle (DC). Thus, to susceptibility to interferers located at certain sensitivity peaks, either the fundamental measurement frequency (Fs) or the duty cycle (DC) can be changed. In accordance with the disclosed embodiments, the receiver's duty cycle (DC) can be varied, based on the location of the undesired interferers, to "steer" sensitivity response peaks and nulls to eliminate certain harmonics from the receiver response spectrum. In general, the higher amplitude sensitivity response peaks should be reduced or eliminated first (for instance, the sensitivity peaks at harmonic indices 2, 3, and 6 in FIG. 6B) since the receiver would be most responsive to these peaks.

Depending on the particular situation, the duty cycle (DC) applied to the receiver can be varied (a) to place sensitivity peaks at locations where known interferers are known not to be located, and/or (b) to change the location of the nulls and place nulls at locations of the known interferers so that those interferers will not be heard at the receiver as the interferer(s) migrate in frequency as some do, landing on or passing through one potential sensitivity peak or another. By changing the duty cycle the locations of sensitivity peaks and/or nulls can be moved around so that the receiver will stop hearing the interferer(s). For instance, in one implementation, the duration of the first time period (Ton) can be varied to alter the duty cycle (D) so that periodic nulls of the frequency domain sinc function are made to coincide with at least some of the undesired response peaks to eliminate certain harmonics from the receive sensitivity spectrum of the receiver. This makes the receiver much more immune to those interferers.

The duty cycle (D) can be varied either dynamically, or by selecting from a pre-determined list of duty cycles (e.g., rotating through a list of duty cycles to eliminate effects of the interferers at the receiver). In the latter case, the particular duty cycles that are included in the pre-determined list of duty cycles will vary depending on the implementation. To select the duty cycles included in this list a "neighborhood analysis" can be performed to determine the frequency ranges or "neighborhoods" that common interferers are most often located in. This way frequency ranges for common interferers that will be relevant over a wide range of situations are known and a list of duty cycles can be determined that will help eliminate the effects of interferes in those frequency ranges.

For instance, in one implementation it was determined that common-mode noise from an external power supply had sharp emission peaks that common moves about within a frequency range from 60 kHz-300 kHz. The inventors experimentally determined that by switching between duty cycles of 33%, 50%, 67% and ≥95% most harmonic susceptibilities can be eliminated as conditions demand. For example, a duty cycle of 33% can be used to eliminate interferers at multiples of three times the fundamental measurement frequency ($F_s$), a duty cycle of 50% can be used to eliminate interferers at multiples of two times the fundamental measurement frequency ($F_s$), a duty cycle of 67% can be used to eliminate interferers at multiples of three times the fundamental measurement frequency ($F_s$) at a more rapid roll-off than 33%, and so on. Examples of this are illustrated graphically in FIGS. 7 through 10.

Figure 7:
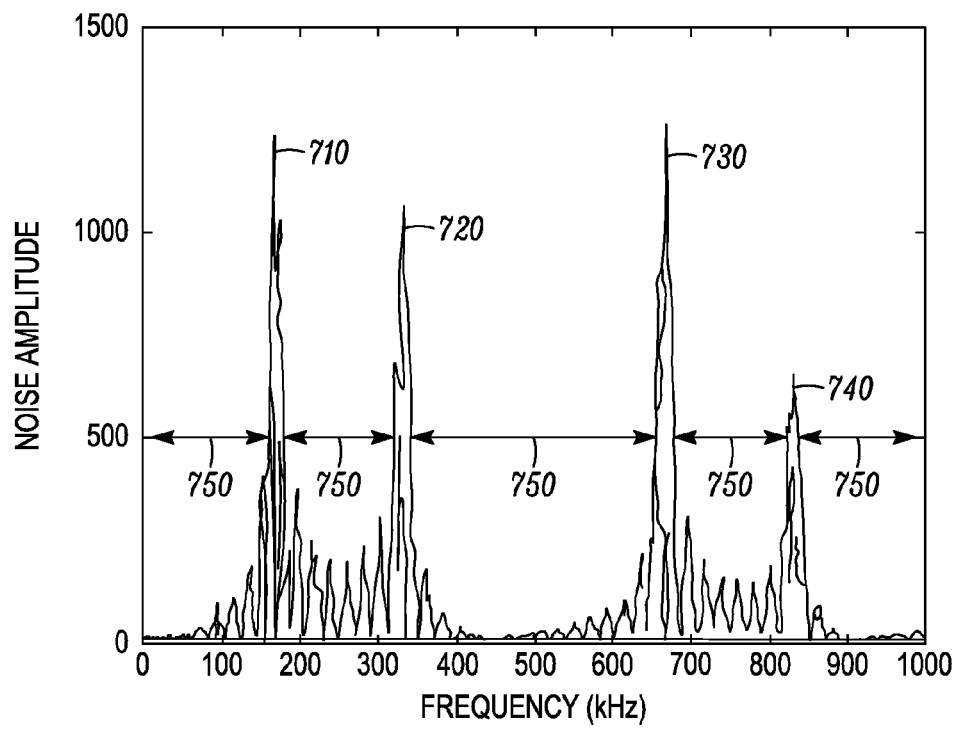
FIG. 7 is a graph that illustrates the measured spectral response of a capacitive touchsensing receiver when a charge integrator is operated at a duty cycle of thirty-three percent (33%) so that the capacitive touchsensing receiver is immune to interferers at or near every third harmonic of the fundamental measurement frequency ($F_s$)

FIG. 7 is a graph that illustrates the measured spectral response of a capacitive touchsensing receiver when a charge integrator is operated at a duty cycle of thirty-three percent (33%) so that the capacitive touchsensing receiver is immune to interferers at or near every third harmonic of the fundamental measurement frequency ($F_s$). FIG. 7 was generated when the fundamental measurement frequency ($F_s$) was 166 kHz and a duty cycle of 33% was used at the charge integrator 255. A duty cycle of 33% can be used to eliminate interferers at harmonics that are multiples of three times the fundamental measurement frequency ($F_s$). As illustrated in FIG. 7, the sensitivity spectrum includes: (A) sharp response peaks of sensitivity (or "sensitivity response peaks") 710-740 at a fundamental measurement frequency ($F_s$) and harmonics thereof; and (B) immunity zones 750 that exist between the sharp response peaks of sensitivity 710-740. In this example, interferers at every third harmonic are eliminated/reduced. Sub-harmonic and intra-harmonic receiver sensitivity can also been seen in this measured response, which are the result of the "burst length" being used at the time. As noted above, in accordance with some of the disclosed embodiments, these lesser sensitivity zones can be reduced, "sculpted", and/or eliminated, by applying convolutional windowing to the duty cycles lengths of the individual pulses within the burst, which were evident and advantageous in other measured results.

Figure 8:
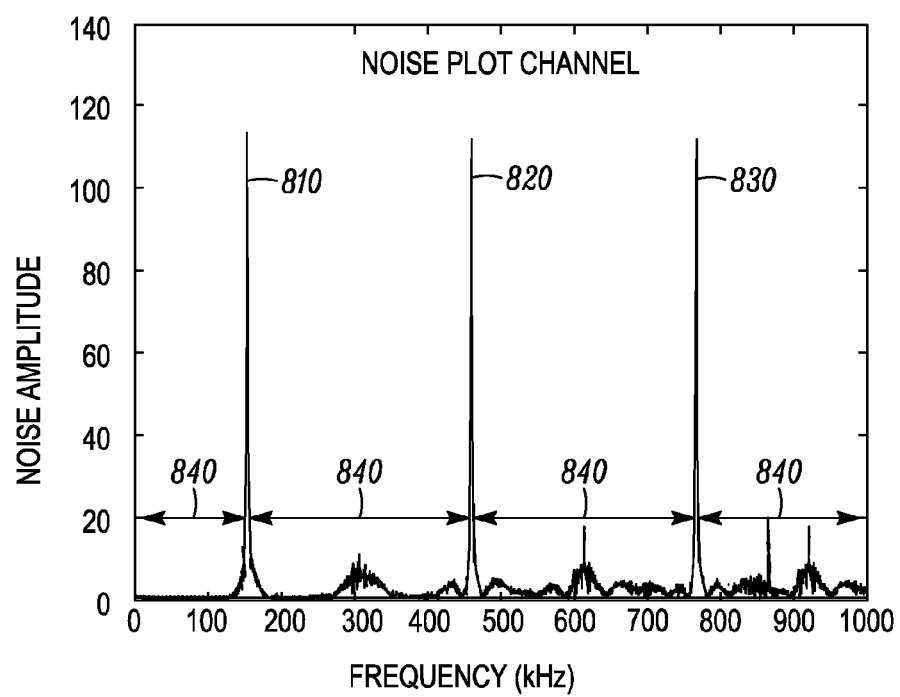
FIG. 8 is a graph that illustrates the measured spectral response of a capacitive touchsensing receiver when a charge integrator is operated at a duty cycle of fifty percent (50%) so that the capacitive touchsensing receiver is immune to interferers at or near even-order harmonics of the fundamental measurement frequency ($F_s$)

FIG. 8 is a graph that illustrates the measured spectral response of a capacitive touchsensing receiver when a charge integrator is operated at a duty cycle of fifty percent (50%) so that the capacitive touchsensing receiver is immune to interferers at or near even-order harmonics of the fundamental measurement frequency ($F_s$) (e.g., 166 kHz). A duty cycle of 50% has a spectrum showing harmonic content only in every other (odd) harmonic, and therefore it can be used to eliminate interferers at even harmonic locations of the fundamental measurement frequency ($F_s$) (i.e., that are integer multiples of two times the fundamental measurement frequency ($F_s$)) such that noise happening at the even harmonic locations will not have any impact. As illustrated in FIG. 8, the sensitivity spectrum includes: (A) sharp response peaks of sensitivity (or "sensitivity response peaks") at a fundamental measurement frequency ($F_s$) 810 and harmonics 820, 830 thereof; and (B) immunity zones 840 that exist between the sharp response peaks of sensitivity 810-830. In this example, interferers at even harmonics are eliminated/reduced.

Figure 9:
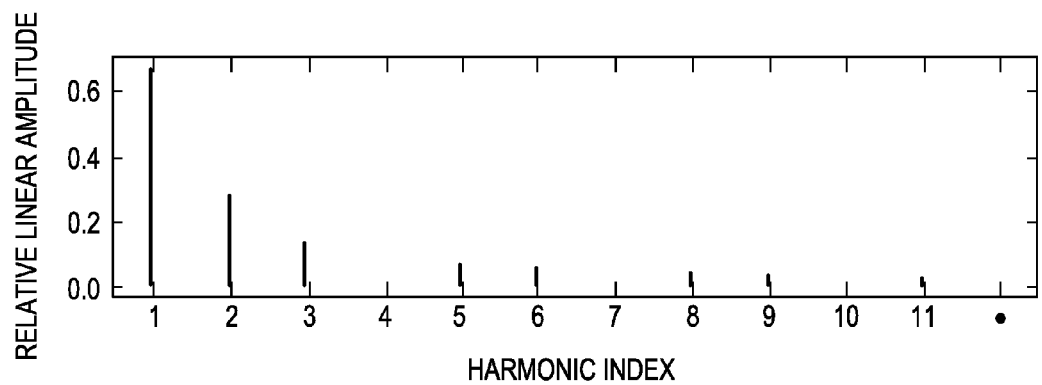
FIG. 9 is a graph that illustrates a frequency-domain response of a periodic time-synchronous receiver when its input gating is operated a duty cycle of sixty-seven percent (67%) so that the receiver is immune to interferers at or near every third harmonic of the fundamental measurement frequency ($F_s$), with a roll-off much faster than the 33% case of FIG. 7.

FIG. 9 is a graph that illustrates a frequency-domain response of a periodic time-synchronous receiver, such as a capacitive touchsensing receiver, when its input gating function is operated a duty cycle of sixty-seven percent (67%) so that the receiver is immune to interferers at or near every third harmonic of the fundamental measurement frequency ($F_s$) (e.g., 166 kHz). The relative linear amplitude of the frequency-domain response at the fundamental measurement frequency ($F_s$) and at each harmonic is illustrated (in no particular units) with respect to harmonic index, where the fundamental measurement frequency ($F_s$) has a harmonic index of one (1), the next higher harmonic of the fundamental measurement frequency ($F_s$) (commonly termed the "second harmonic") has a harmonic index of two (2), the third harmonic of the fundamental measurement frequency ($F_s$) has a harmonic index of three (3), etc. A duty cycle of 67% can be used to eliminate interferers at harmonics that are multiples of three times the fundamental measurement frequency ($F_s$). As such, the relative linear amplitude of the frequency-domain response at harmonic indices 4, 7, 10, etc. is effectively zero. In addition, it can be observed that the roll-off is faster when the duty cycle is 67% in comparison to FIG. 7 when the duty cycle is 33%.

Figure 10:
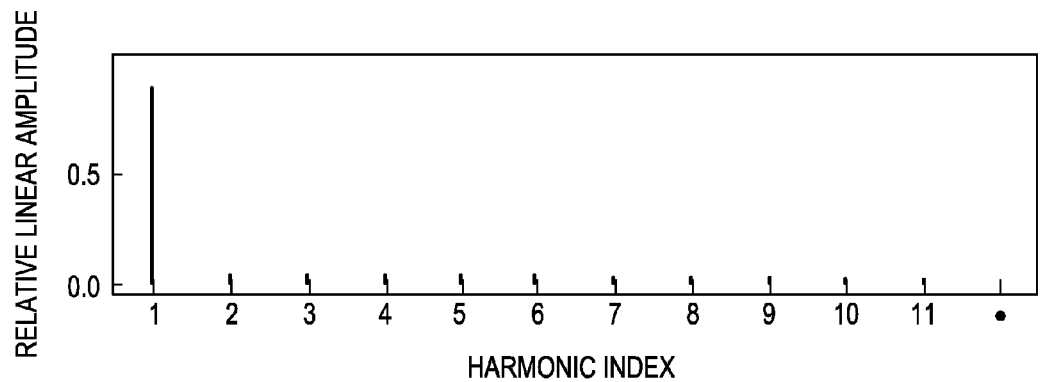
FIG. 10 is a graph that illustrates a frequency-domain response of a periodic time-synchronous receiver when its gating function is operated at a duty cycle of ninety-five percent (95%), and all harmonic spectral response peaks are reduced nearly to zero.

FIG. 10 is a graph that illustrates a frequency-domain response of a periodic time-synchronous receiver, such as a capacitive touchsensing receiver 250, when its gating function is operated at a duty cycle of ninety-five percent (95%) (e.g., when a gating signal having a duty cycle of 95% is applied at the transmission gate control input 265). The relative linear amplitude of the frequency-domain response at the fundamental measurement frequency ($F_s$) and at each harmonic is illustrated with respect to harmonic index, where the fundamental measurement frequency ($F_s$) has a harmonic index of one (1), the next higher harmonic of the fundamental measurement frequency ($F_s$) (commonly termed the "second harmonic") has a harmonic index of two (2), the third harmonic of the fundamental measurement frequency ($F_s$) has a harmonic index of three (3), etc. When its gating function is operated at a duty cycle of ninety-five percent (95%), all harmonic spectral response peaks are reduced nearly to zero. A duty cycle of 95% or more, but necessarily less than 100%, can be used to effectively eliminate interferers at all harmonics that above the fundamental measurement frequency ($F_s$). This is especially advantageous when the required system speed can tolerate the longer times for $T_{on}$ 320.

In the embodiments described above, the duty cycle (D) of a gating signal 165/265 applied to a transmission gate is varied to eliminate the effects of noise at a receiver 150/250. For instance, in one specific implementation described with reference to FIG. 2, the gating signal 265 is applied to a transmission gate 235 of a GCI 252 implemented at a CT receiver 250, where the transmission gate 235 can be inserted between a touchscreen sensing line 210 and a capacitor-based charge integrator 255. It should be appreciated that the exemplary embodiments described with reference to FIGS. 1 and 2 are not limiting and that other variations exist. It should be understood that various changes can be made without departing from the scope of the invention as set forth in the appended claims and the legal equivalents thereof. The embodiments described with reference to FIGS. 1 and 2, for example, can be implemented a wide variety of different implementations.

For example, in accordance with the disclosed embodiments, the duty cycle of any signal that controls an on/off state of a PTS receiver 150 can be varied to reduce and/or eliminate noise. In other implementations, the transmission gate 135 can be inserted between an antenna 110 and a main "phenomenon recognizer" 155 to vary the duty cycle of the pulse applied to the phenomenon recognizer 155. For instance, the signal that has its duty cycle varied can include, but is not limited to, a signal that is used to: a) turn on and off the power of a receiver block 150, b) gate a clock that feeds a receiver block 150, c) gate a local oscillator (LO) input to the receiver block 150, d) gate one of the necessary transistor gate biases or base biases within the receiver block 150, e) short the input to AC ground upstream of the receiver block 150, or even inside the receiver block 150, f) disable the bias of the upstream antenna 110 if it is an active antenna (e.g., as in GPS), g) switch digital attenuators found in some receivers from nominal to maximum, etc.

Those of skill will appreciate that the various illustrative logical blocks, modules, circuits, and steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. As used herein the term "module" refers to a device, a circuit, an electrical component, and/or a software based component for performing a task. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the connecting lines or arrows shown in the various figures contained herein are intended to represent example functional relationships and/or couplings between the various elements. Many alternative or additional functional relationships or couplings may be present in a practical embodiment.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method, comprising:
receiving, at a transmission gate of a periodic time-synchronous (PTS) receiver, a composite signal and a gating control input signal, the composite signal comprising an input signal and a noise signal, the gating control input signal having a variable duty cycle and applied to the transmission gate of the PTS receiver to turn the transmission gate on and off; and
applying, based on an operational frequency of the PTS receiver, a convolutional window to the variable duty cycle of the gating control input signal to adjust the gating control input signal effective to reduce one or more components of the noise signal in an output signal of the transmission gate, the one or more reduced components of the noise signal having a harmonic relationship to the operational frequency of the PTS receiver.

2. The method as recited in claim 1, wherein:
the gating control input signal comprises a series of pulses that control whether the transmission gate is open, each pulse of the series having a duration, wherein a time between consecutive pulses being a measurement period;
the transmission gate is open during on-state intervals that correspond to the pulses, each on-state interval corresponding to the duration of a respective one of the pulses;
the transmission gate is closed during off-state intervals defined by corresponding ones of the measurement periods between the consecutive pulses; and
a ratio of the duration of a pulse and a corresponding measurement period associated with that same pulse defines the variable duty cycle.

3. The method as recited in claim 2, wherein applying the convolutional window to the variable duty cycle of the gating control input signal applied to the transmission gate comprises selectively varying pulse duration of the gating control input signal to vary respective on-state intervals of the transmission gate effective to reduce the one or more components of the noise signal in the output signal of the transmission gate.

4. The method as recited in claim 3, wherein:
the transmission gate selectively allows the composite signal to pass through when the transmission gate is open during the on-state intervals; and
the output signal output by the transmission gate when the composite signal is selectively allowed to pass is a replica of the composite signal with the one or more reduced components of the noise signal.

5. The method as recited in claim 4, wherein:
the input signal comprises desired information that represents a physical phenomenon;
the composite signal has a composite receive spectrum that is attributable to the input signal and the noise signal;
the composite spectrum includes desired information at a particular fundamental measurement frequency and extraneous information attributable to the noise signal; and
selectively varying pulse duration of the gating control input signal comprises adjusting the variable duty cycle of the gating control input signal to vary the on-state intervals of the transmission gate effective to reduce certain sensitivity peaks in the composite spectrum of the composite signal that correspond to one or more components of the noise signal.

6. The method as recited in claim 5, wherein the input signal comprises desired information that represents the physical phenomenon at the particular fundamental measurement frequency, the PTS receiver further comprises a signal recognition and output module that responds to energy present at the particular fundamental measurement frequency and to energy present at other frequencies, and the method further comprises:
receiving the output signal at the signal recognition and output module; and
extracting the desired information from the output signal to generate output data that is not impacted by the one or more components of the noise signal present in the composite receive spectrum at other frequencies.

7. The method as recited in claim 6, wherein extracting the desired information comprises integrating the desired information included in the output signal to generate the output data that digitally represents integrated desired information of the input signal that is not impacted by the one or more components of the noise signal present in the composite receive spectrum at the other frequencies.

8. A system, comprising:
a periodic time-synchronous (PTS) receiver comprising a transmission gate configured to receive a composite signal that includes a desired input signal and a noise signal, and to output an output signal; and
a duty cycle controller configured to generate a gating control input signal applied to the transmission gate of the PTS receiver and to apply, based on the operational frequency of the PTS receiver, a convolutional window to a duty cycle of the gating control input signal effective to reduce one or more components of the noise signal in the output signal of the transmission gate, the one or more reduced components of the noise signal having a harmonic relationship to the operational frequency of the PTS receiver.

9. The system as recited in claim 8, wherein:
the gating control input signal comprises a series of pulses that control whether the transmission gate is open, each pulse of the series having a duration, wherein a time between consecutive pulses being a measurement period;
the transmission gate is open during on-state intervals that correspond to the pulses, each on-state interval corresponding to the duration of a respective one of the pulses;
the transmission gate is closed during off-state intervals defined by corresponding one of the measurement periods between the consecutive pulses; and
a ratio of the duration of a pulse and a corresponding measurement period associated with that same pulse defines a variable duty cycle.

10. The system as recited in claim 9, wherein the duty cycle controller is configured to selectively vary pulse duration of the gating control input signal to vary corresponding on-state intervals of the transmission gate effective to reduce the one or more components of the noise signal present in the output signal output by the transmission gate.

11. The system as recited in claim 10, wherein:
the transmission gate blocks the composite signal when the transmission gate is closed during one of the off-state intervals;
allows the composite signal to pass through when the transmission gate is open during the on-state intervals effective to selectively pass the composite signal; and
the output signal output by the transmission gate when the composite signal is selectively passed is a replica of the composite signal with the one or more reduced components of the noise signal.

12. The system as recited in claim 11, wherein:
the desired input signal comprises desired signal content that represents a physical phenomenon;
the composite signal has a composite receive spectrum that is attributable to the input signal and the noise signal; and
the composite spectrum includes the desired signal content at a particular fundamental measurement frequency and extraneous information attributable to the noise signal.

13. The system as recited in claim 12, wherein the duty cycle controller adjusts the variable duty cycle of the gating control input signal effective to reduce certain sensitivity peaks in the composite spectrum of the composite signal that correspond to one or more components of the noise signal.

14. The system as recited in claim 13, wherein the PTS receiver further comprises a signal recognition and output module that responds to the desired signal content centered about the particular fundamental measurement frequency and energy present at other frequencies.

15. The system as recited in claim 14, wherein the signal recognition and output module is configured to:
receive the output signal from the transmission gate of the PTS receiver; and
extract, from the output signal, the desired signal content to generate output data that is not impacted by the one or more components of the noise signal present in the composite receive spectrum at the other frequencies.

16. The system as recited in claim 15, wherein the signal recognition and output module comprises an integrator module configured to measure and integrate desired signal content in the output signal to generate the output data that represents integrated desired signal content of the input signal.

17. A system comprising:
a capacitive touchscreen having a plurality of transmit lines that includes a first touchscreen sensing line designed to generate an excitation signal that drives electric charge;
a capacitive sensing system comprising a capacitive touch-sensing receiver having a plurality of gated charge integrators, a first of the gated-charge integrators comprising a transmission gate coupled to the first touchscreen sensing line and configured to receive a composite signal that includes the excitation signal and a noise signal added to the excitation signal prior to reception by the transmission gate, and output an output signal; and
a duty cycle controller configured to generate a gating control input signal to control operation of the transmission gate and to apply, based on an operational frequency of the capacitive touch-sensing receiver, a convolutional window to a variable duty cycle of the gating control input signal effective to reduce one or more components of the noise signal having a harmonic relationship to the operational frequency of the capacitive touch-sensing receiver.

18. The system as recited in claim 17, wherein:
the gating control input signal comprises a series of pulses that control whether the transmission gate is open and in an on-state, each pulse in the series having a duration that defines a particular on-state interval, a time between consecutive pulses being a measurement period;

the transmission gate is open during on-state intervals that correspond to the pulses, each on-state interval corresponding to the duration of a respective one of the pulses;

the transmission gate is closed and in an off-state during off-state intervals defined by corresponding periods between consecutive pulses; and a ratio of the duration of a pulse and a corresponding measurement period associated with that same pulse defines the variable duty cycle for that measurement period.

19. The system as recited in claim 18, wherein the duty cycle controller is configured to selectively vary pulse duration of the gating control input signal to vary corresponding on-state intervals of the transmission gate effective to reduce one or more components of the noise signal present in the output signal output by the transmission gate.

20. The system as recited in claim 19, wherein:

the transmission gate blocks the composite signal when the transmission gate is closed during one of the off-state intervals;

allows the composite signal to pass through when the transmission gate is open during the on-state intervals effective to selectively pass the composite signal; and the output signal output by the transmission gate when the composite signal is selectively passed is a replica of the composite signal during the corresponding on-state interval with one or more reduced components of the noise signal.

21. The system as recited in claim 20, wherein the excitation signal and the noise signal are received in combination as the composite signal that has a composite receive spectrum including charge that is attributable to the excitation signal and the noise signal, the composite signal including charge from the excitation signal at a particular fundamental measurement frequency and extraneous information attributable to the noise signal.

22. A system according to claim 21, wherein the duty cycle controller adjusts the variable duty cycle of the gating control input signal effective to reduce certain sensitivity peaks in the composite spectrum of the composite signal that correspond to one or more components of the noise signal.

23. The system as recited in claim 21, wherein the first gated-charge integrator of the capacitive touch-sensing receiver further comprises a charge integrator coupled to the transmission gate and configured to:

respond to energy centered about the particular fundamental measurement frequency and to other energies present at other frequencies corresponding to certain sensitivity peaks of the charge integrator;

receive the output signal that includes the composite signal from which the one or more components of the noise signal are substantially eliminated; and accumulate, from the output signal, charge for the duration of the pulses during on state-intervals to generate integrated charge output data that is not impacted by the one or more components of the noise signal present in the composite receive spectrum corresponding to certain sensitivity peaks of the charge integrator, the integrated charge output data representing charge integrated from the excitation signal and is used to determine the presence or absence of an object within the vicinity of the capacitive touch screen.

* * * * *

UNITED STATES PATENT AND TRADEMARK OFFICE
CERTIFICATE OF CORRECTION

PATENT NO.           : 9,298,303 B2
APPLICATION NO.      : 12/650699
DATED                : March 29, 2016
INVENTOR(S)          : Wagner et al.

Page 1 of 1

It is certified that error appears in the above-identified patent and that said Letters Patent is hereby corrected as shown below:

Claims

In Column 22, Line 26, claim 2, after "having a duration" delete "wherein".

In Column 23, Line 45, claim 9, after "having a duration" delete "wherein".

Signed and Sealed this
Seventh Day of June, 2016

Michelle K. Lee
*Director of the United States Patent and Trademark Office*